United States Patent
Kato et al.

(10) Patent No.: US 7,439,878 B2
(45) Date of Patent: Oct. 21, 2008

(54) APPARATUS AND METHOD FOR PROCESSING AND DISPLAYING TRAFFIC INFORMATION IN AN AUTOMOTIVE NAVIGATION SYSTEM

(75) Inventors: Manabu Kato, Novi, MI (US); Deepak Ramaswamy, Farmington Hills, MI (US)

(73) Assignee: Xanavi Informatics Corporation, Zama-shi, Kanagawa-ken (JP)

( * ) Notice: Subject to any disclaimer, the term of this patent is extended or adjusted under 35 U.S.C. 154(b) by 422 days.

(21) Appl. No.: 11/158,967

(22) Filed: Jun. 22, 2005

(65) Prior Publication Data

US 2006/0058950 A1 Mar. 16, 2006

Related U.S. Application Data

(63) Continuation-in-part of application No. 10/938,813, filed on Sep. 10, 2004, now Pat. No. 7,176,813.

(51) Int. Cl.
*G08G 1/123* (2006.01)
(52) U.S. Cl. ........... 340/988; 340/995.13; 701/200; 701/208
(58) Field of Classification Search ........... 340/988
See application file for complete search history.

(56) References Cited

U.S. PATENT DOCUMENTS

| | | | | |
|---|---|---|---|---|
| 5,164,904 | A * | 11/1992 | Sumner | 340/905 |
| 5,864,305 | A * | 1/1999 | Rosenquist | 340/905 |
| 6,006,076 | A * | 12/1999 | Nakamura | 455/186.1 |
| 6,091,956 | A | 7/2000 | Hollenberg | 455/456 |
| 6,161,072 | A | 12/2000 | Clapper | 701/93 |
| 6,438,561 | B1 * | 8/2002 | Israni et al. | 701/213 |
| 6,456,931 | B1 | 9/2002 | Polidi et al. | 701/208 |
| 6,463,382 | B1 * | 10/2002 | Bullock | 701/117 |
| 6,480,783 | B1 | 11/2002 | Myr | 701/117 |
| 6,587,785 | B2 | 7/2003 | Jijina et al. | 701/210 |
| 6,590,507 | B2 | 7/2003 | Burns | 340/995.13 |
| 6,615,130 | B2 | 9/2003 | Myr | 701/117 |
| 6,622,087 | B2 | 9/2003 | Anderson | 701/209 |

(Continued)

FOREIGN PATENT DOCUMENTS

JP 8044997 2/1996

(Continued)

*Primary Examiner*—George A Bugg
*Assistant Examiner*—Eric M Blount
(74) *Attorney, Agent, or Firm*—Gifford, Krass, Sprinkle, Anderson & Citkowski, P.C.

(57) ABSTRACT

A vehicle navigation system for use with a traffic information broadcast system which transmits traffic data relating to primary road segments and a communication system which transmits traffic data relating to road segments in a local geographic area. A broadcast receiver receives the broadcast traffic data from the broadcast system and stores the received data. A communication transmitter, when activated, transmits a data request to the communication system. A communication receiver receives the local traffic data from the communication system in response to the data request while a processor displays traffic information on a display screen corresponding to the received broadcast traffic data and the received local traffic data. The local traffic data includes both traffic information relating to local road segments as well as non-traffic temporal events, such as weather, and time-related events which affect traffic flow.

15 Claims, 15 Drawing Sheets

U.S. PATENT DOCUMENTS

| | | | |
|---|---|---|---|
| 6,657,558 B2 * | 12/2003 | Horita et al. | 340/995.13 |
| 6,690,292 B1 | 2/2004 | Meadows et al. | 340/905 |
| 6,707,421 B1 * | 3/2004 | Drury et al. | 701/208 |
| 6,720,920 B2 | 4/2004 | Breed et al. | 342/386 |
| 6,799,201 B1 | 9/2004 | Lee et al. | 709/217 |
| 6,810,328 B2 | 10/2004 | Yokota et al. | 701/210 |
| 6,829,475 B1 | 12/2004 | Lee et al. | 455/419 |
| 6,847,889 B2 * | 1/2005 | Park et al. | 701/209 |
| 6,931,320 B2 * | 8/2005 | Mori et al. | 340/995.13 |
| 7,110,880 B2 * | 9/2006 | Breed et al. | 701/207 |
| 7,222,018 B2 * | 5/2007 | Uyeki et al. | 701/209 |
| 7,268,700 B1 * | 9/2007 | Hoffberg | 340/905 |
| 2002/0082767 A1 | 6/2002 | Mintz | 701/117 |
| 2003/0093209 A1 | 5/2003 | Andersson et al. | 701/93 |
| 2003/0187573 A1 | 10/2003 | Agnew et al. | 701/201 |
| 2003/0191568 A1 | 10/2003 | Breed | 701/36 |
| 2003/0229446 A1 | 12/2003 | Boscamp et al. | 701/213 |
| 2004/0068364 A1 | 4/2004 | Zhao et al. | 701/201 |
| 2004/0088104 A1 | 5/2004 | Izbicki et al. | 701/117 |
| 2004/0249559 A1 | 12/2004 | Mintz | 701/117 |
| 2004/0260458 A1 * | 12/2004 | Park et al. | 701/200 |
| 2005/0027437 A1 | 2/2005 | Takenaga et al. | 701/117 |
| 2005/0027449 A1 * | 2/2005 | Marsh | 340/905 |
| 2007/0219715 A1 * | 9/2007 | Uyeki et al. | 701/209 |

FOREIGN PATENT DOCUMENTS

| | | |
|---|---|---|
| JP | 2002090156 | 3/2002 |
| JP | 2002-287613 | 10/2002 |
| JP | 2002340584 | 11/2002 |
| JP | 2003/302230 | 10/2003 |

* cited by examiner

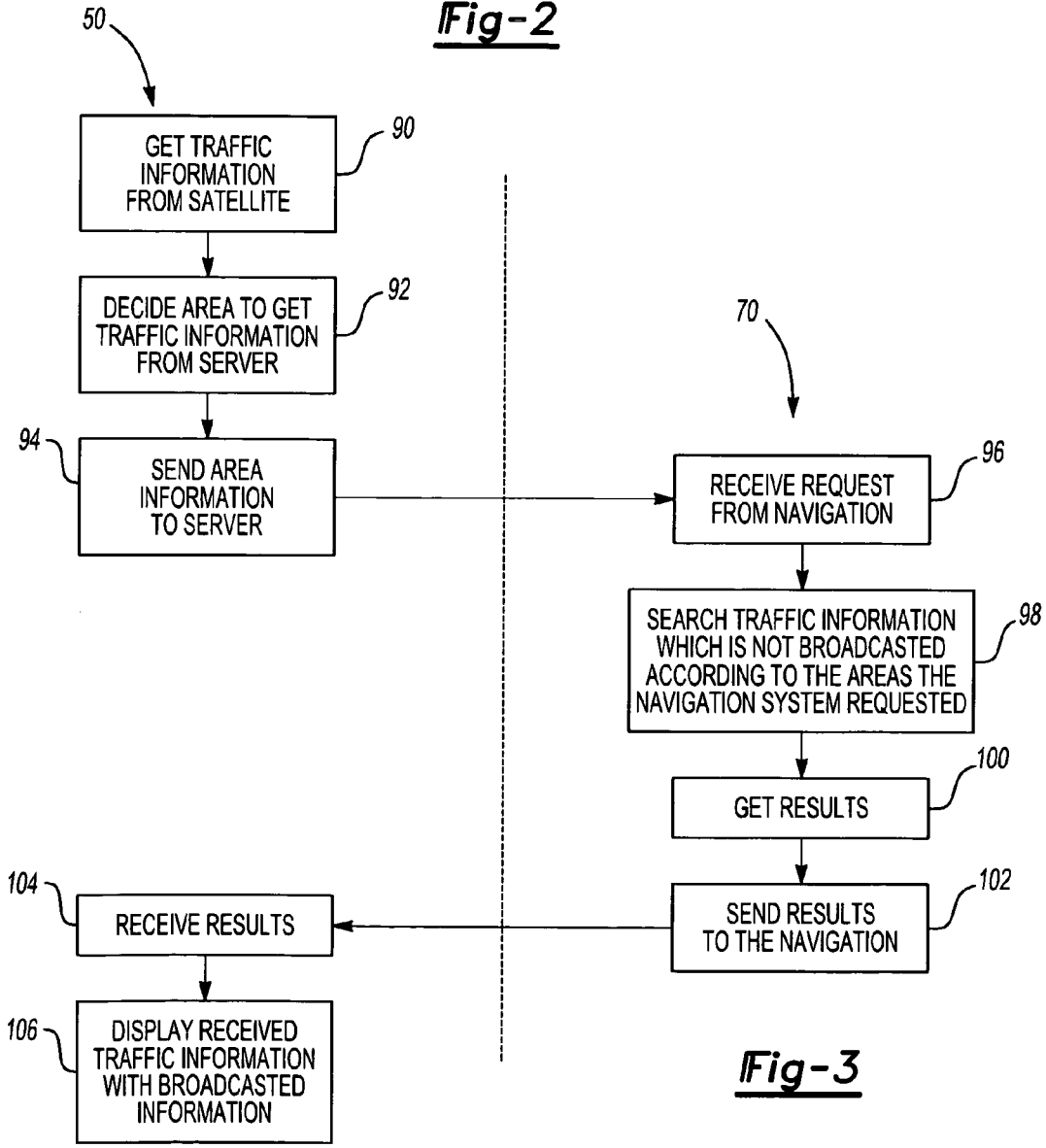

| MESH ID | LINK ID | START NODE ID | END NODE ID | LINK LENGTH [m] | TIME TRAVEL [sec] | ROAD TYPE | ROAD NAME |
|---|---|---|---|---|---|---|---|
| 100 | 10 | 1 | 2 | 500 | 25 | INTERSTATE | I-696 |
| 100 | 20 | 2 | 4 | 300 | 30 | LOCAL ROAD | 12 MILE RD |

| AREA ID | LOCATION CODE | DIRECTION | EVENT CODE | EXTENT | DURATION TIME |
|---|---|---|---|---|---|
| 12 | 1 | POSITIVE | 1 | 5 | FOR THE NEXT 15 MINUTES |
| 12 | 2 | NEGATIVE | 2 | 6 | FOR NEXT 1 HOUR |
| ... | ... | ... | ... | ... | ... |

| LOCATION TABLE NUMBER | SERVICE AREA ID | LOCATION CODE | TRAFFIC EVENT CODE | DIRECTION | DURATION | DIVERSION | EXTENT | ADDITIONAL INFORMATION | WEATHER CODE | SPORTS CODE | TIME STAMP |
|---|---|---|---|---|---|---|---|---|---|---|---|
| 7 | 12 | 4456 | 701 | 1 | 0 | 0 | 7 | NONE | 45 | 0 | 1/20/05 11:00:01 |
| 6 | 10 | 5621 | 76 | 0 | 0 | 0 | 3 | NONE | 44 | 0 | 2/22/05 12:02:33 |
| 20 | 4 | 4990 | 124 | 0 | 0 | 0 | 6 | NONE | 0 | 12 | 4/06/05 19:00:01 |

*Fig-16*

TABLE 1.3: WEATHER CODES

| WEATHER | CODE |
|---|---|
| HEAVY SNOW (MORE THAN 4 INCHES) | 45 |
| MILD SNOW (BETWEEN 2-4 INCHES) | 44 |
| LIGHT SNOW (LESS THAN 1 INCH) | 43 |
| HEAVY RAIN (VISIBILITY LESS THAN 500 FEET) | 87 |
| MODERATE RAIN (VISIBILITY LESS THAN 1500 FEET) | 89 |
| TORNADOES | 70 |

*Fig-17*

TABLE 1.3: EVENT (NON-TRAFFIC) CODES

| NON-TRAFFIC EVENT | CODE |
|---|---|
| POLITICAL RALLY (FEDERAL) | 66 |
| POLITICAL RALLY (LOCAL) | 65 |
| AUTO SHOW/EXHIBIT | 40 |
| PARADE (NEW YEAR) | 98 |
| PARADE (ST. PATRICK DAY) | 90 |
| ELEMENTARY SCHOOL CLASS END TIME | 786 |
| HIGH SCHOOL CLASS END TIME | 788 |
| UNIVERSITY CLASS END TIME | 799 |
| ELEMENTARY SCHOOL CLASS BEGIN TIME | 800 |
| ... | |

*Fig-18*

TABLE 1.4: USER PREFERENCES

| |
|---|
| USE FREEWAY IF RAINFALL LESS THAN 2 INCHES |
| MINIMIZE USE OF FREEWAY IF HEAVY RAINFALL (VISIBILITY LESS THAN 500 FEET) |
| DETOUR IF ROUTE PASSES THROUGH MAJOR LEAGUE BASEBALL GAME END TIME |
| DO NOT DETOUR IF ROUTE PASSES THROUGH HIGH SCHOOL GAMES |

APPARATUS AND METHOD FOR PROCESSING AND DISPLAYING TRAFFIC INFORMATION IN AN AUTOMOTIVE NAVIGATION SYSTEM

CROSS-REFERENCE TO RELATED APPLICATIONS

This application is a continuation-in-part of U.S. patent application Ser. No. 10/938,813, entitled "System and Method for Processing and Displaying Traffic Information in an Automotive Navigation System," filed Sep. 10, 2004, and which is hereby incorporated herein by reference.

BACKGROUND OF THE INVENTION

I. Field of the Invention

The present invention relates generally to automotive navigation systems and, more particularly, to such a navigation system which processes both nationally broadcast traffic data and locally broadcast traffic data.

II. Description of Related Art

Automotive navigation systems have become increasing prevalent in automotive vehicles. Such navigation systems typically include a display screen mounted in the vehicle in a position visible to the driver. A roadmap is displayed on the screen from an internally contained map database and, by utilizing GPS to determine the position of the vehicle, also displays the position of the vehicle on the screen.

Many major roads, such as interstates and major arteries, include traffic sensors which detect the average vehicle speed at the position of the sensor on its given road as well as traffic events which potentially affect traffic flow. These traffic sensors transmit this traffic flow data to a central station which, after combining the received signals from the various traffic flow sensors across the country, transmits the combined traffic flow data to a geographic area. For example, in the United States, traffic flow data from the contiguous 48 states is continuously transmitted by satellite.

One disadvantage of the previously known navigation systems, however, is that the traffic data transmitted by satellite is necessarily limited to major roads and does not include traffic flow data for local roads in the geographic area. Consequently, these previously known navigation systems provide little or no information with respect to traffic flow along the local roads and are thus of limited utility for predicting local traffic flow and rerouting of the vehicle to a selected destination to minimize travel time.

A still further disadvantage of these previously known navigation systems is that such navigation systems only provide traffic flow data of the currently existing conditions. However, there are many non-traffic temporal events that can provide significant impact upon the future traffic flow conditions. For example, weather conditions, such as a predicted snowstorm, may significantly impact the traffic flow conditions during the expected travel of the vehicle from its current position and to the selected destination. Likewise, other temporal non-traffic events, such as sporting events, parades, and the like, may also impact the traffic flow along the anticipated route of the vehicle.

A still further disadvantage of these previously known navigation systems is that such navigation systems fail to use statistical or historical data of traffic flow conditions along road segments in the locality frequently traveled by the vehicle as a function of time. For example, certain road segments may encounter excessive congestion during weekday rush hours, and yet have little or no traffic congestion during the non-rush hours or weekends. As such, these previously known navigation systems were unable to predict favorable routes for the vehicle to the desired destination while taking into account such historical statistical data.

SUMMARY OF THE PRESENT INVENTION

The present invention provides a navigation system which overcomes all of the above-mentioned disadvantages of the previously known navigation systems.

In brief, the vehicle navigation system of the present invention is provided for use with a traffic information broadcast system which transmits data relating to primary road segments and a communication system which transmits traffic data relating to road segments in a local geographic area. Such local traffic data may include actual traffic flow conditions on local road segments as well as non-traffic temporal events which affect traffic flow. Such temporal events include weather and weather forecasts, sporting events and the like.

The navigation system of the present invention includes a broadcast receiver which receives the broadcast traffic data from the broadcast system. Following receipt, the broadcast traffic data is stored in memory.

A communication transmitter, when activated, transmits a data request to the communication system. This communication request includes the current vehicle location, as determined by GPS, or alternatively may include a list of geographic grids for which traffic flow information is desired. Such list of geographic grids is particularly advantageous where the navigation system has calculated a route from the current position of the vehicle and to a destination inputted by the user, in which case the grids overlie the route to the selected destination.

A communication receiver then receives the local traffic data from the communication system in response to the data request and stores that information in memory. Preferably, the data from the communication system is compared with the data received from the broadcast system to eliminate any redundant data between the broadcast traffic data and the local traffic data.

A processor, such as a microprocessor, then analyzes the received data and displays the received data on a display screen for the navigation system.

In the event that the user has inputted a destination from the current position of the vehicle, the processor also calculates the most favorable route from the current position of the vehicle and to the destination. In most cases, the most favorable route comprises the fastest route from the current position of the vehicle and to the destination. However, if desired, the route calculation from the position of the vehicle and to the destination may accommodate special desires and wishes of the user. For example, the user may elect not to travel on certain roads, such as interstate freeways, so that the route calculation to the destination will necessarily exclude such roads even though the travel time to the destination is increased.

In calculating the most favorable route, the processor takes into account not only the current traffic flow conditions as provided by the broadcast traffic data and local traffic data, but also the historical or statistical traffic flow conditions of the road segments along the route. Furthermore, the processor also accounts for any predicted non-traffic temporal events, such as weather forecasts, sporting events and the like, which may affect traffic flow. Then, utilizing conventional routing algorithms, the processor determines the most favorable route as a function of historical, current and predicted traffic conditions to the destination point and displays that route on the display screen of the navigation system.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 2 is a view of a data structure illustrating different event codes;

FIG. 3 is a process flowchart illustrating a first preferred embodiment of the present invention;

FIG. 16 is a preferred embodiment of an exemplary structure for the traffic statistical database of the present invention;

FIG. 17 is an exemplary weather code table of the present invention;

FIG. 18 is an exemplary temporal non-traffic event code of the present invention;

DETAILED DESCRIPTION OF PREFERRED EMBODIMENTS OF THE PRESENT INVENTION

Figure 1:
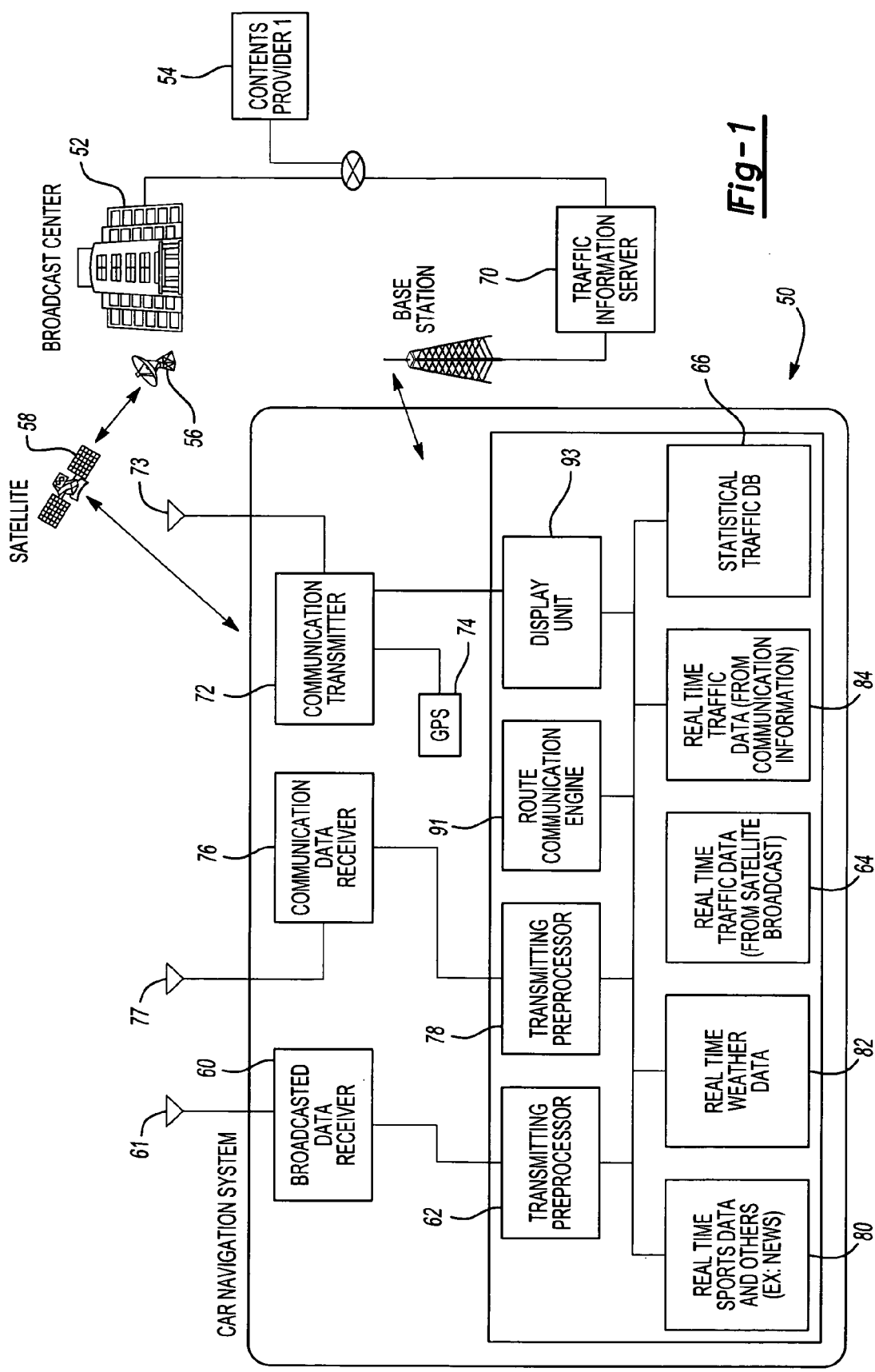
FIG. 1 is a block diagrammatic view illustrating a preferred embodiment of the present invention.

With reference first to FIG. 1, a block diagrammatic view of a preferred embodiment of a car navigation system 50 is shown for use with a central station 52 which collects traffic data across a geographical area, such as the United States, from a plurality of traffic content providers 54, such as traffic flow sensors. Other data collecting devices and sources can include traffic cameras, traffic information collected by police or highway departments, website sentry collected information, speed sensors located in cars and transmitted to a central server, speed calculations made from the car position, as well as any other source indicative of traffic flow conditions.

The central station 52 then collates the inputted data from the sensors 54 and transmits via a transmitting antenna 56 to a satellite 58. The satellite 58 then retransmits the collated data back to the earth where it is received by a data receiver 60 of the navigation system 50.

Since the central station 52 receives the traffic data for a wide geographic area, e.g. the contiguous 48 states in the United States, the data transmitted by the central station 52 via the satellite 58 to the receiver 60 is necessarily limited to primary road segments, such as interstate highways, major arteries and the like. Traffic information for secondary local roads cannot be effectively transmitted by satellite due to the vast number of local roads coupled with the limited bandwidth of the satellite transmission. Furthermore, the satellite transmission preferably includes the formatted protocol of ISO 14819 entitled "Traffic and Travel Information (TTI)."

In the well known fashion, the traffic flow information collected by the central station 50 and transmitted via the satellite 58 to the navigation system 50 includes an event code corresponding to traffic flow conditions and other traffic events for the various primary road segments within its transmitted geographical area. Such information transmitted by the central station 52 includes, for example, information relating to various traffic events, such as roadwork, flooded roads, etc. The transmitted information may also include other data, such as weather conditions, which pertain to traffic flow and a partial exemplary traffic flow event code table is illustrated in FIG. 2.

Referring again to FIG. 1, the data receiver 60 receives the raw data via an antenna 61 from the satellite 58 and communicates this raw data to the upper levels for processing by the system 50. In particular, the receiver 60 communicates the received data to a transmitting preprocessor 62 which, in turn, stores the received information in a real-time broadcast traffic database 64 in memory. The transmitting preprocessor 62 may also perform additional functions, e.g. the elimination of redundant or unchanged information or corrupted information, prior to storing the information in the broadcast traffic database memory 64.

Still referring to FIG. 1, the transmitting preprocessor 62 also optionally stores the received broadcast data in a historical or traffic database 66 in memory together with a timestamp for the received data. Consequently, the statistical traffic database stored in memory 66, over time, will contain traffic flow conditions for road segments as a function of date and time. Preferably, the transmitting preprocessor 62 preprocesses the information stored in the statistical traffic database memory 66 to limit the stored data to only those road segments in the locality traveled by the vehicle to minimize the memory storage requirements of the memory for the database 66.

Still referring to FIG. 1, the navigation system 50 communicates with a communication system 70 which broadcasts traffic information in a localized geographic area. The local traffic information includes not only current traffic flow conditions, but also predicted non-traffic temporal events, such as weather forecasts, sporting events, parades and the like which affect traffic flow in a local area. Furthermore, the communication system 70, unlike the broadcast central station 52, transmits traffic flow information for local non-primary roads and, optionally, local primary roads.

In order to receive and process the local traffic data, the navigation system 50 includes a communication transmitter 72 which transmits a data request through an antenna 73 to the communication system 70. As subsequently described in greater detail, the data request transmitted by the communication transmitter 72 comprises one of two forms. In its first form, the communication transmitter transmits the location of the navigation system 50 (and thus of the vehicle) as determined from a GPS system 74. Alternatively, the communication transmitter may send a data request comprising a listing of geographic grids for which local traffic information is desired. For example, where the user has entered a destination into the navigation system 50, the list of geographic grids sent by the communication transmitter 72 as the data request to the communication system 70 may comprise the road segments along the desired route.

The navigation system 50 further includes a communication receiver 76 which receives the local traffic data via an antenna 77 from the communication system 70 in response to the data request. The communication receiver 76 then communicates the received data to a transmitting preprocessor 78 which determines the type of processing that will be performed on the data. Additionally, like the transmitting preprocessor 62, the transmitting preprocessor 78 may also eliminate redundant or unchanged data as well as corrupted data received from the communication system 70.

More specifically, if the received data contains information relating to temporal non-traffic events, such as sporting events, public events and the like which affect traffic, that data is stored as a real-time event data in memory 80. Similarly, real-time weather information is stored in memory 82 while real-time traffic information for local road segments is stored in memory 84, which may be the same memory or contiguous to memory 82.

The navigation system 50 also includes a route calculation engine 91 for determining a most favorable route, as well as a display screen 93 for displaying route/traffic information. The screen 93 is preferably a touch screen to enable the user to input data, e.g. the address of a desired destination, although any type of input device, such as voice recognition, keyboard, cellular telephone, and/or the like may be used.

It will be understood, of course, that even though the various components of the system are illustrated as separate boxes in FIG. 1, the actual components may be integrated. For example, the receiver 76 and transmitter 72 may comprise a single transceiver.

With reference now to FIG. 3, a process flowchart illustrating the acquisition of both the broadcast traffic data as well as the local traffic data is shown. At step 90, the navigation system 50 receives the broadcast traffic data of primary road segments or road links from the satellite 58. That data is then stored in the broadcast traffic database memory 64 as previously described. Step 90 then proceeds to step 92.

At step 92, the navigation system determines the area from which to receive local traffic information from the communication system 70. Preferably, in the event that a route has not been programmed into the navigation system 50, step 92 determines the current position of the navigation system 50 from the GPS system 74 (FIG. 1) as the geographic area for which local traffic information is desired. Conversely, if a route from the current position of the vehicle and to a preselected destination has been inputted by the user, typically through the touch screen display 93, step 92 determines the geographic grids overlapping the road segments along the programmed route, including any alternate routes, to be the information for which local traffic information is desired. Step 92 then proceeds to step 94.

At step 94, the communication receiver 72 (FIG. 1) transmits the data request, i.e. the current position of the vehicle or a list of geographic grids along a preselected route, to the communication system 70. Any conventional means may be used to transmit the data request to the communication system, such as cellular telephone, Wi-Fi network, Wi-Max network, Bluetooth and the like.

The communication system 70 receives the data request at step 96 and then proceeds to step 98. At step 98, the communication system searches its database for traffic data for local roads corresponding to the local geographic position of the navigation system or the route programmed into the navigation system. Step 98 also preferably eliminates data that is redundant with the data transmitted by the broadcast center 52. Such redundant data could comprise information for the same road link, in which case the more current information for the road link would be retained and the older data eliminated. Furthermore, the local traffic data transmitted by the communication system preferably includes not only the real-time local traffic data for local roads, but also information relating to non-traffic temporal events, including predicted future events, such as weather, public events and the like. Step 98 then proceeds to step 100. At step 100, the communication system 70 collates the data for transmission to the navigation system 50. Step 100 then proceeds to step 102 which transmits the requested data to the navigation system 50.

At step 104, the communication receiver 76 in the navigation system receives the response to its data request from the communication system 70. Step 104 then proceeds to step 106 which displays the combined information from the broadcast system 52 and communication system 70 on the display screen 93 for the navigation system 50.

Figures 4, 5:
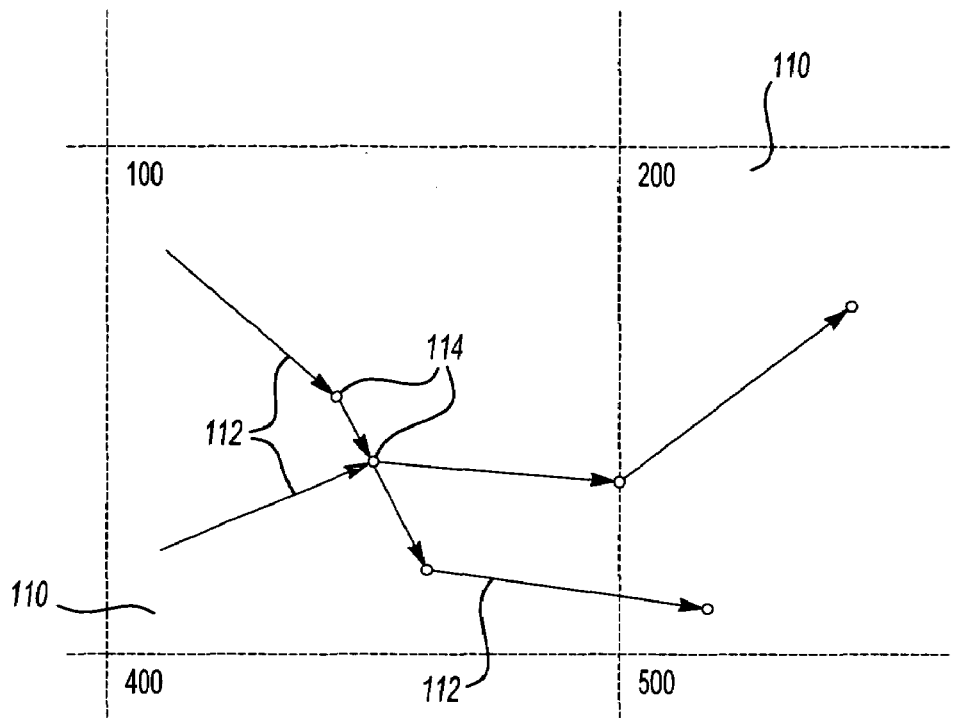
FIG. 4 is a diagrammatic view illustrating one portion of a road link for an exemplary geographic area.
FIG. 5 is an exemplary road link table.

With reference now to FIGS. 4-9, a preferred data structure for correlating the road segments or links, both for the primary roads and local roads, is illustrated. In FIG. 4, a grid or mesh is superimposed over each geographic area and each mesh has its own unique mesh ID.

As shown in FIG. 4, a plurality of road segments or road links 112 are contained within each mesh 110 and each mesh 110 has its own unique identifier within its geographic area. Furthermore, these road links each extend between two second nodes 114. Each node 114 is also assigned its own unique identification number within its particular mesh 110.

With reference now to FIG. 5, an exemplary road link table is shown for a portion of mesh ID 100 of FIG. 4. More specifically, in FIG. 5 the road link table 116 includes a data field 118 corresponding to the mesh ID which is 100 in this example. The road link table 116 table 116 further includes a road link or road segment ID 120 data field corresponding to the ID for the individual road links 112 in the mesh ID 100.

A data field corresponding to the starting node ID 122 as well as a field corresponding to the ending node 124 is also contained in the road link table 116. These node IDs correspond to the node IDs 114 in FIG. 4.

The road link table 116 further includes a data field 126 corresponding to the length of the road link in the field 120 as well as a time travel data field 128 for each road link.

Lastly, the road link table 116 includes a data field 130 indicative of the road type as well as a data field 132 which contains the name for the road link. The entire road link table 116 is stored in a map database 234 (FIG. 13) memory in the navigation system 60.

Figures 6, 7:
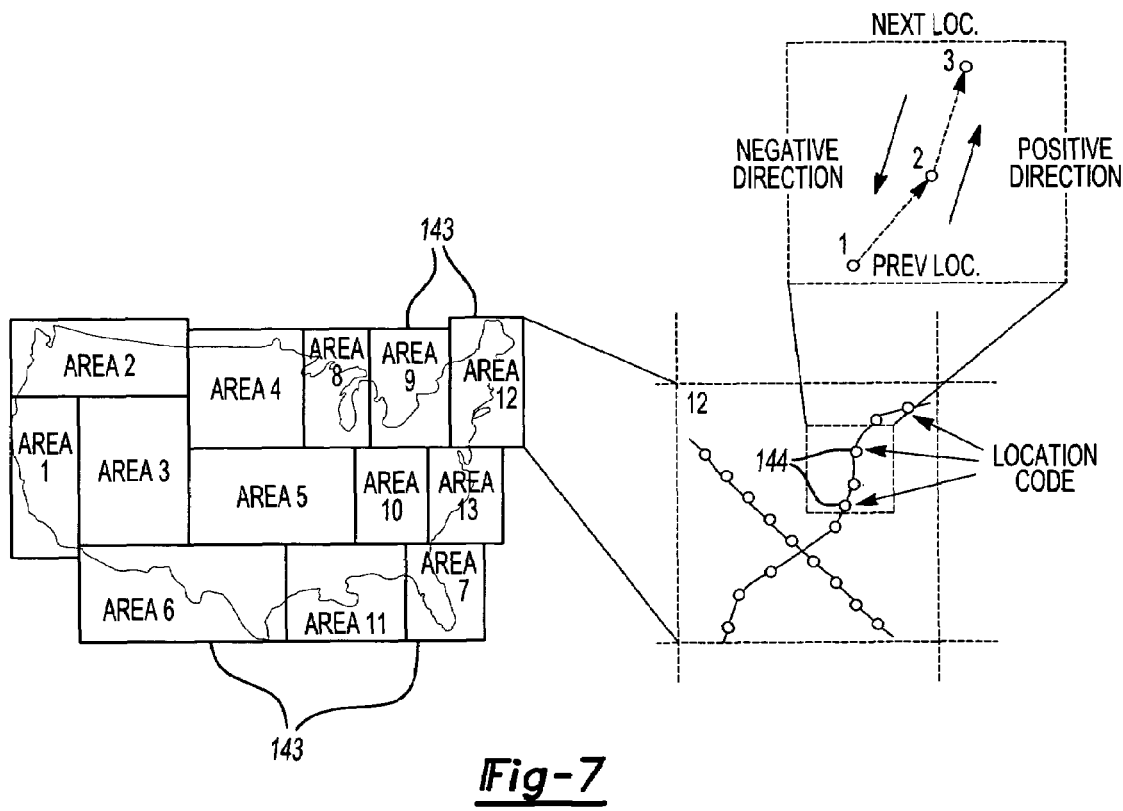
FIG. 6 is an exemplary location code table.
FIG. 7 is a diagrammatic view illustrating the application of the location code table to a map.

With reference now to FIGS. 6 and 7, an exemplary location code table is illustrated in FIG. 6 which contains a representation of not only the position of the vehicle, but also its direction of travel. The location code table 140 includes a first area data field 142 representative of a geographic area 143 (FIG. 7). In addition, the location code table 140 includes a location code data field 144, each of which is unique to a particular road link within the area 12. These location codes 144 are preferably situated in the middle of its associated road link, i.e. midway between the start node and the ending node for each road link.

The location code table 140 further contains a data field 146 indicative of the previous location code as well as a data field 148 indicative of the next location code. Consequently, the current location code 140 when taken together with the previous location code 146 and next location code 148 will represent the direction of travel of the vehicle.

The location code table also contains a data field 150 representative of the location of its associated location code 144 as well as a data field 152 which contains a representation of the name of the road link. The location code table, like all tables, is stored in the memory in the map database 234 of the navigation system.

Figure 8:
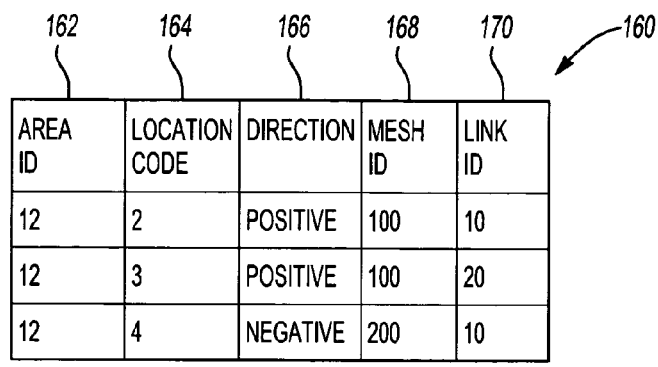
FIG. 8 is an exemplary link-location code relation table.
Figure 9:
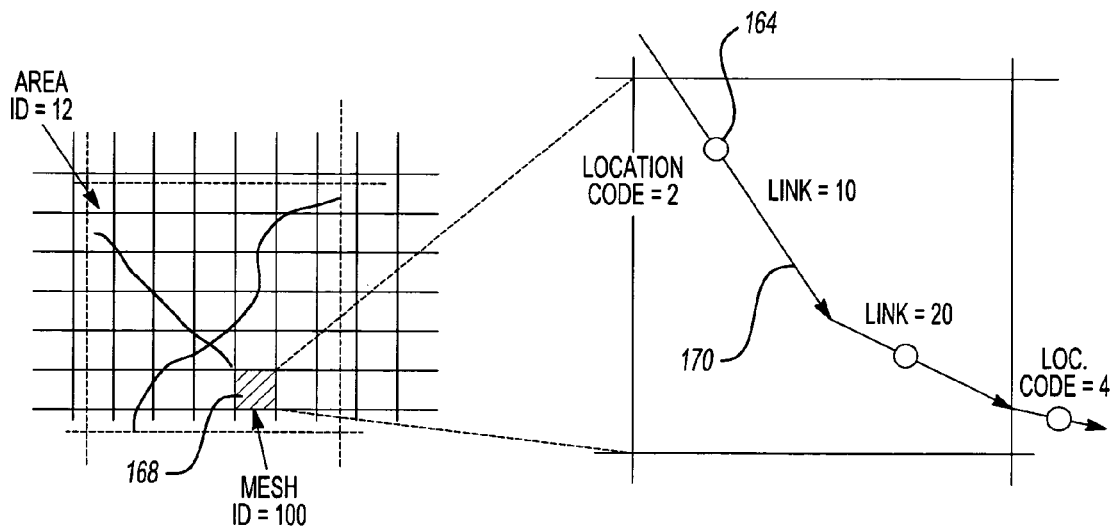
FIG. 9 is a diagrammatic view illustrating the impact of the link-location code relation table to a geographic area.

With reference now to FIGS. 8 and 9, FIG. 8 is a representation of an exemplary link-location code relation table 160 for the navigation system 60. The link-location code relation table relates the location codes (FIGS. 6 and 7) to particular road links. The link-location code relation table 160 includes a data field 162 which contains the ID of the area and corresponds to field 142 in the location code table 140. Similarly, the link-location code relation table contains a data field 164 which contains the location code corresponding to the location code 144 in the location code table 140.

The link-location code relation table 160 also contains a data field 166 corresponding to the direction of travel of the vehicle. The data field 166 is derived from the location code field 144, previous location code field 146, and next location code field 148 of the location code table 140. By way of example only, an eastern direction of travel of the vehicle may be assigned a "positive" direction and, conversely, a westward direction of travel assigned a "negative" direction of travel.

Lastly, the link-location code relation table 162 contains a mesh ID data field 168 which corresponds to the mesh ID field 118 in the road link table 116 (FIG. 5) as well as a road link ID field 170 which represents the road link identification within the particular mesh ID. Consequently, the road link-location code relation table 160 functions to associate both the position and direction of travel of the vehicle with the individual road links contained within the map database 234.

As previously described, the traffic broadcast system not only provides traffic flow data for primary road segments, but also transmits event codes indicative of traffic events occurring along individual road links. For example, an exemplary traffic event table 178 is illustrated in FIG. 2 in which a particular event code 180 is associated with a particular traffic event 182.

Figures 10, 11:
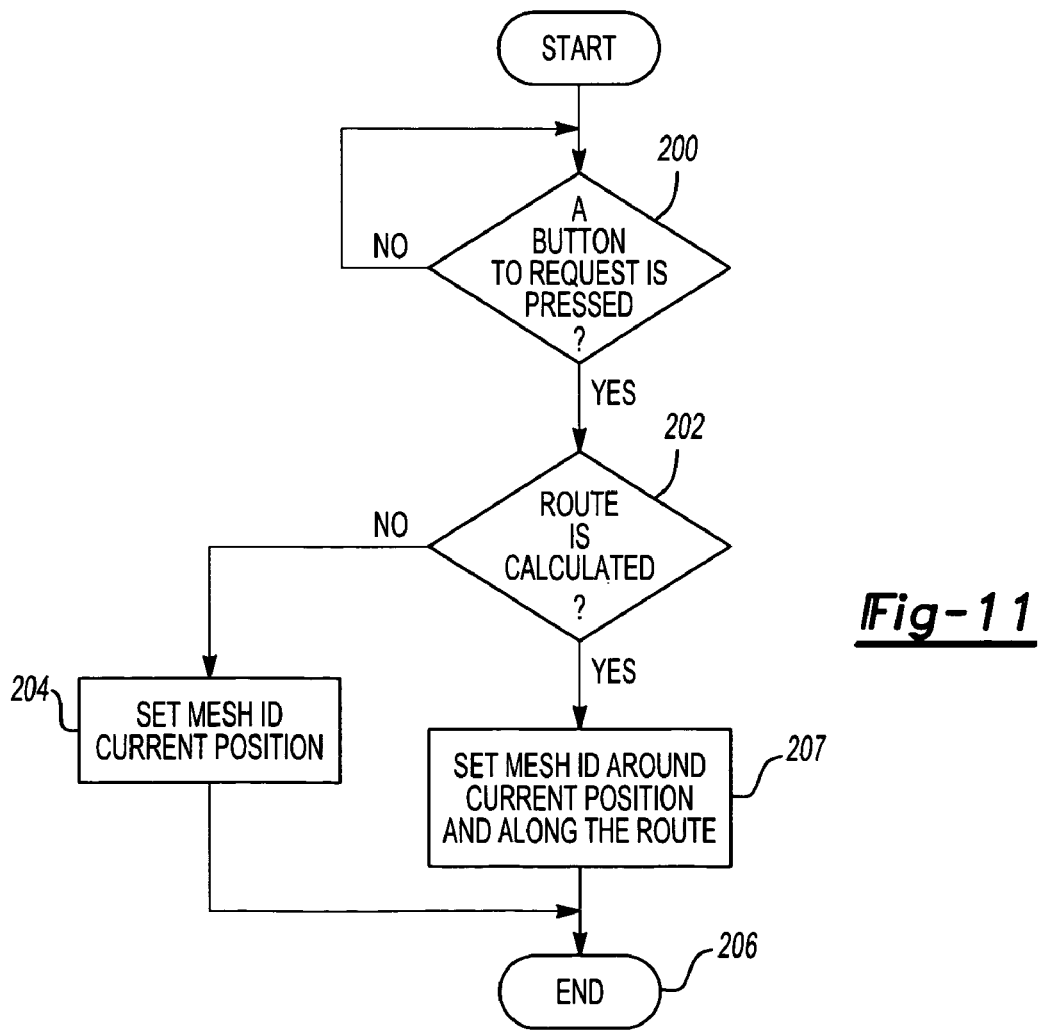
FIG. 10 is an exemplary broadcasted traffic information data structure.
FIG. 11 is a flowchart illustrating the operation of the communication system to receive local traffic.

With reference now to FIG. 10, the data structure for the broadcast traffic data 180 is illustrated. The broadcast traffic data includes a first data field 182 corresponding to the geographic area 143 (FIG. 7) as well as the location code 184. The location codes 184, as previously discussed, are unique for each different area.

The broadcast traffic data 180 also contains a data field 186 indicative of the direction that is affected by the traffic event code. The traffic event code 188, corresponding to the event table (FIG. 2), is also contained within the traffic data.

The traffic data 180 further includes a data field 190 indicative of the extent or number of sequential location codes which are affected by the event code 188, as well as a data field 192 which represents the duration of the event corresponding to the event code 188. Consequently, the broadcasted traffic data 180 provides information to the navigation system not only of the existence of traffic-affecting events that have occurred along the predetermined route, but also the extent and duration of those traffic events. This, in turn, enables the navigation system to determine the impact on the particular traffic event on the vehicle travel time.

With reference now to FIG. 11, a flowchart is shown illustrating how information is received by the navigation system 50 from the communication system 70. At step 200, the navigation system 50 determines whether or not it has been activated, e.g. by pressing a button, automatically on system power up or iteratively at periodic time intervals, to request local traffic data from the communication system 70. If no request is made, step 200 branches back to itself. Conversely, once a request to receive local data has been activated by the system, step 200 branches to step 202.

At step 202, the navigation system 60 determines whether or not a preselected destination for the vehicle has been programmed into the navigation system. If not, step 202 branches to step 204 in which the mesh ID of the current position of the vehicle as determined from the location code table 140 (FIG. 6) and link-location code relation table 160 (FIG. 8). Step 204 then branches to step 206 after which the navigation system 60 transmits its data request corresponding to the mesh ID to the communication system 70.

Conversely, if a destination has been programmed by the user, typically through the touch screen 93 on the navigation system 50, the navigation system 50, through its route calculation engine 91 (FIG. 1), has identified the road links, and mesh IDs through which those road links extend, for the most favorable route utilizing the route calculation engine 91. Consequently, in this event, step 202 branches instead to step 207 in which the mesh ID overlapping each road link along the route is determined and sent as a part of the data request to the communication system 70.

Figure 12A:
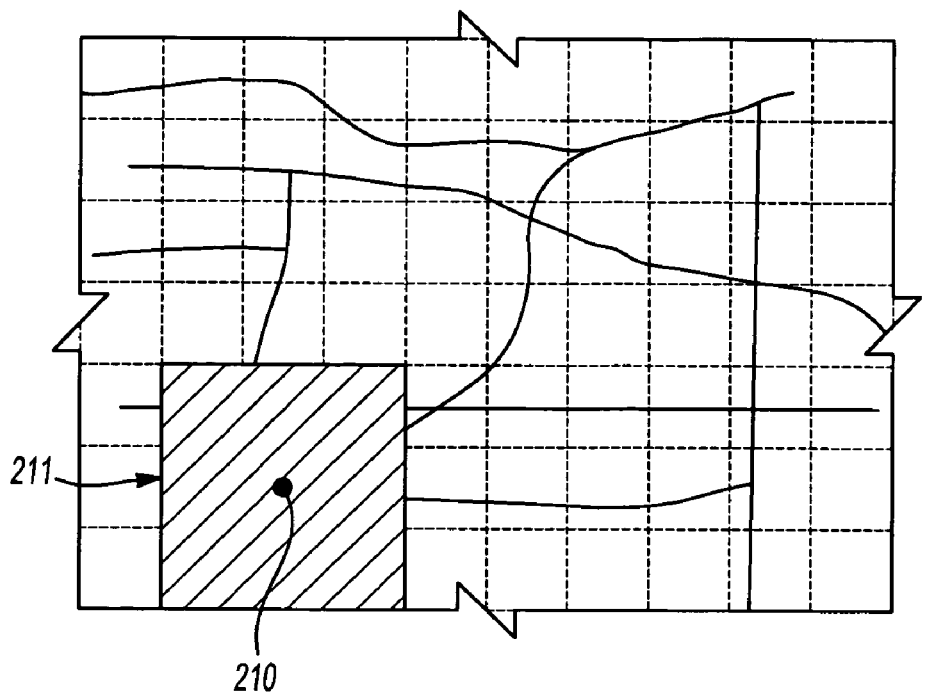
FIGS. 12A and 12B are figures illustrating the operation of the local traffic communication system.

For example, where no route has been programmed into the navigation system, it is only necessary for the navigation system to receive local traffic data only within its local geographic area defined by the mesh ID and for the adjacent meshes 110 as shown at 211 in FIG. 12A, assuming the vehicle is at position 210. In this case the navigation system 50 determines the current mesh ID as well as the adjacent mesh IDs from the map database and transmits this information in the data request to the communication system 70.

Figure 12B:
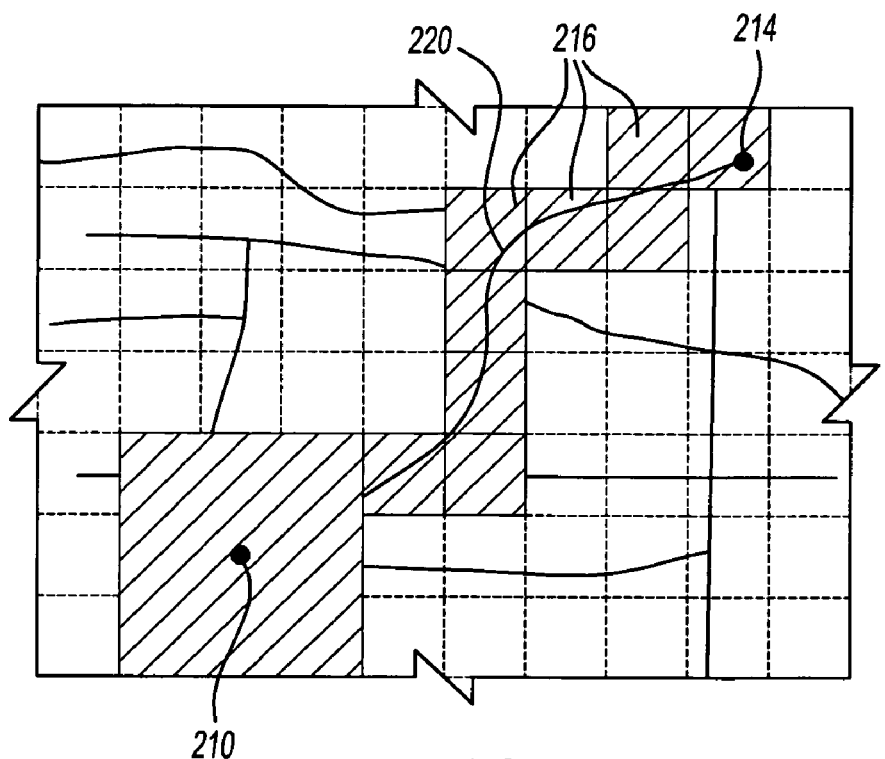

FIG. 12B, on the other hand, represents step 206 (FIG. 11) in which a destination position 214 has been programmed into the navigation system 50. In this event, in addition to the meshes around the current position 210 of the vehicle corresponding to FIG. 12A, the navigation system also sends the mesh ID of each and every mesh 216 along the programmed route 220.

It can therefore be seen that, by limiting the data requested from the communication system 70 to only the local area around the vehicle, or to the area along the programmed route for the vehicle, the amount of data received and processed by the navigation system 60 from the local traffic data is maintained at a minimum and yet satisfactory level.

Figure 13:
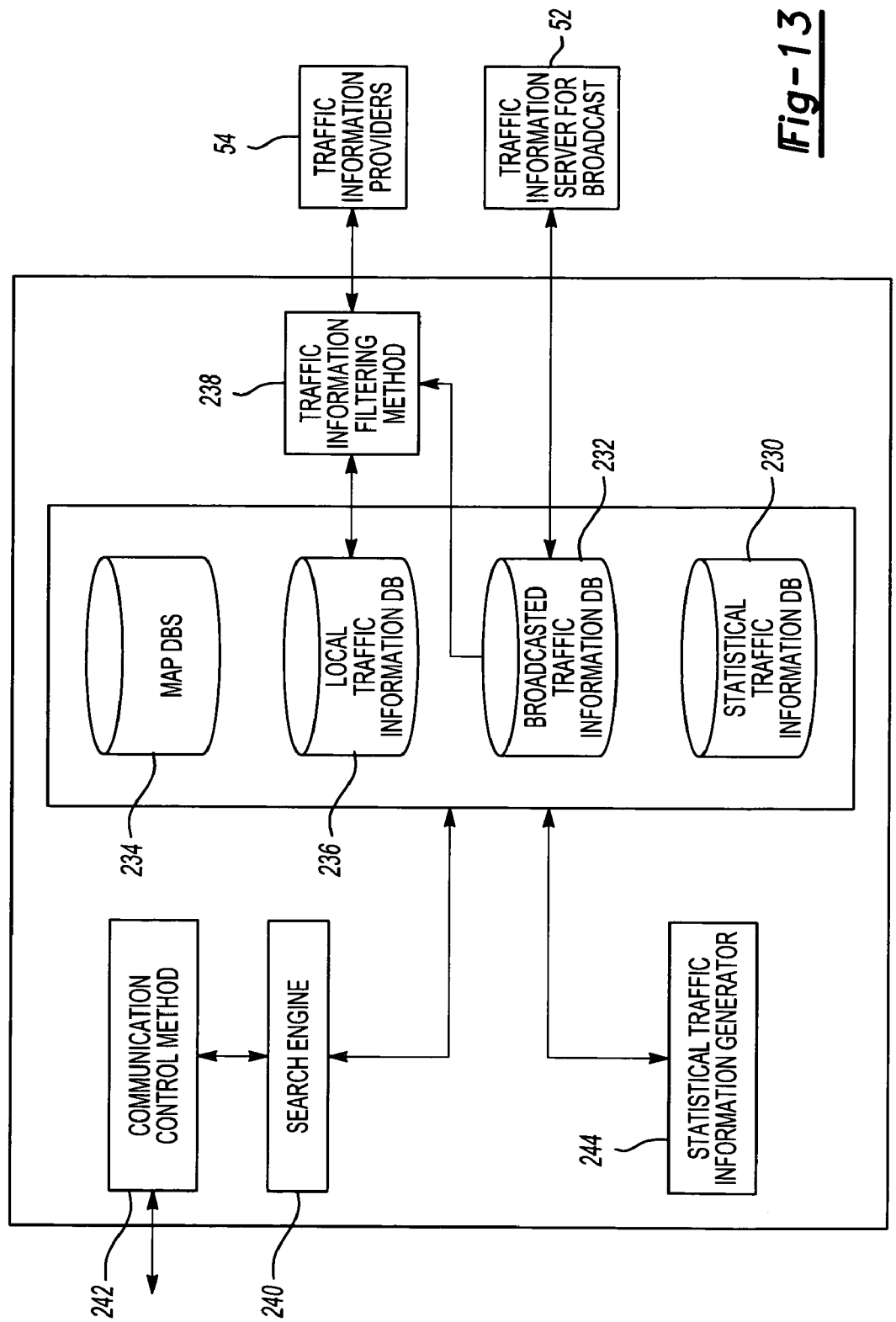
FIG. 13 is a software architectural block diagrammatic view of the preferred embodiment of the present invention.

With reference now to FIG. 13, a block diagrammatic view is shown illustrating the processing for the received traffic data, both broadcast traffic data and local traffic data, by the traffic information server 70. The traffic information server 70 contains a number of databases all of which are contained in digital memory accessible to the server 70. These databases include a statistical traffic information database 230 which contains statistical travel information for various road links in geographic areas traveled by the vehicle. The data maintained by the server 70 also includes a broadcasted traffic database 232 in which real-time traffic information for primary roads received from the central station 52 is stored by the server 70 in memory.

The traffic server 70 also includes a map database 234. The map database also contains the various road link tables previously described.

The traffic server 70 also has a local traffic database 236 in which traffic data corresponding to local roads and received from the communication system 70 is stored. A traffic information filtering method 238 preferably receives both the local traffic information from the communication system 70 as well as the broadcast traffic data from the central station 52 and eliminates any data in the local traffic data that is redundant, i.e. for the same road link, with the broadcast data prior to saving the local data in the local traffic database 236. Preferably, the most current traffic data is stored and older redundant data discarded.

Still referring to FIG. 13, access to the databases 230, 232, 234 and 236 is provided by a conventional search engine 240 through a communication control method 242 to the navigation system. A statistical traffic information generator 244 also accesses the stored traffic data in the traffic databases in order to provide statistical information of traffic flow as a function of day and time.

The map databases 234 contain geographic data and include the road link table, location code table, street names, link-location code relation table and the like. Such information is static unless modified through road construction.

The statistical information database stores the information that is made from past experience by statistical analysis. The estimated link travel time is calculated according to various criteria including the day of the week, the time of day, holiday or non-holiday and the like. As such, the statistical traffic database 230 necessarily includes a time and date field.

Figure 14:
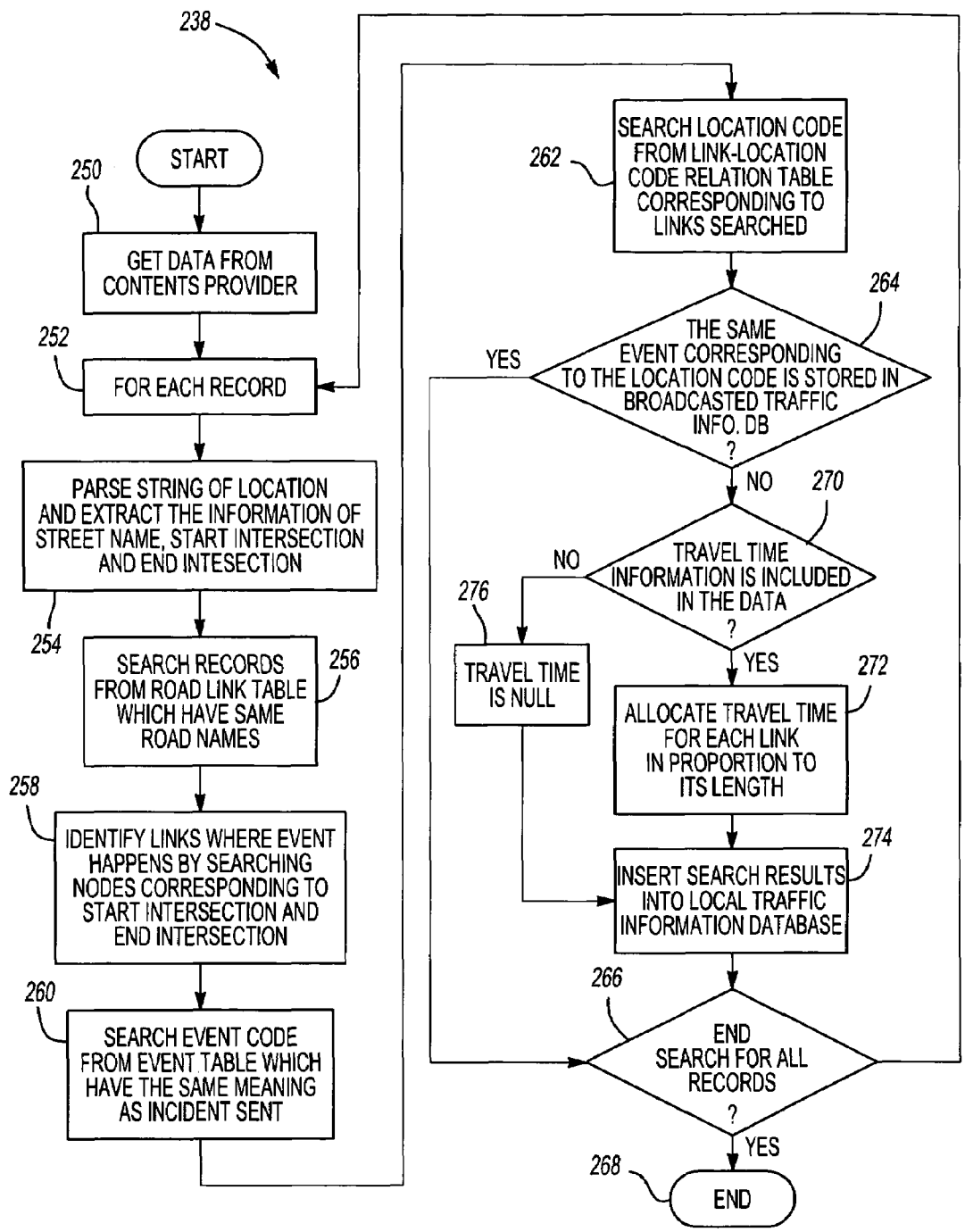
FIG. 14 is a flowchart illustrating the filtering method to eliminate redundant data as well as process local traffic information data.

With reference now to FIG. 14, a flowchart illustrating the operation of the traffic server 70 is shown. At step 250, the server 70 first receives the data from the traffic providers 54. In most cases, local traffic data corresponding to a plurality of local road links is provided to the server 70 by the communication system 70 in response to the data request. Step 250 then proceeds to step 252 which is repeated for each record received by the server 70 in response to its data request.

For each record, step 252 proceeds to step 254 where the starting point and stopping point of each road link is extracted together with the name of the road link. Step 254 then proceeds to step 256.

Step 256 then searches the records from the road link table (FIG. 5) which have the same name as the received data. Step 256 then proceeds to step 258.

At step 258 the server 70 identifies the starting and ending node ID for each road link identified at step 256. Step 258 then proceeds to step 260.

At step 260, the server 70 searches the event code from the event code table (FIG. 2) and then proceeds to step 262. At step 262, the location code from the link-location code relation table (FIG. 8) is searched to correlate to the road link search at step 258. Step 262 then proceeds to step 264.

At step 264, the server 70 determines if the same event code corresponding to the location code searched at step 262 is stored in the broadcast traffic information database 232 (FIG. 14) or not. If so, step 264 proceeds to step 266 where the navigation system determines if all of the records received at step 250 have been processed. If not, step 266 iterates back to step 252 where the above process is repeated. Otherwise, step 266 proceeds to step 268 and exits the flowchart traffic information filtering method.

Conversely, if the same event corresponding to the location code is not stored in the broadcasted traffic information database 232, step 264 instead branches to step 270 which determines if the travel time for the road link is included in the data received from the providers. If so, step 270 proceeds to step 272 where the server 70 allocates travel time for each road link in proportion to its length. Step 272 then proceeds to step 274 where the search results are inserted into the local traffic database 236 (FIG. 13).

Conversely, if the travel time information is not included in the information received from the providers, step 270 instead branches to step 276 which sets the travel time to zero prior to insertion of the data into the local traffic database 236. In this event, the travel time for such road links will be separately computed or a default or historic travel time used.

Consequently, as can be seen from FIG. 14, the traffic information filtering step 238 provides a simple, yet effective, way of preventing redundant data from being included in both the broadcast traffic information database 232 and local traffic database 236.

Figure 15:
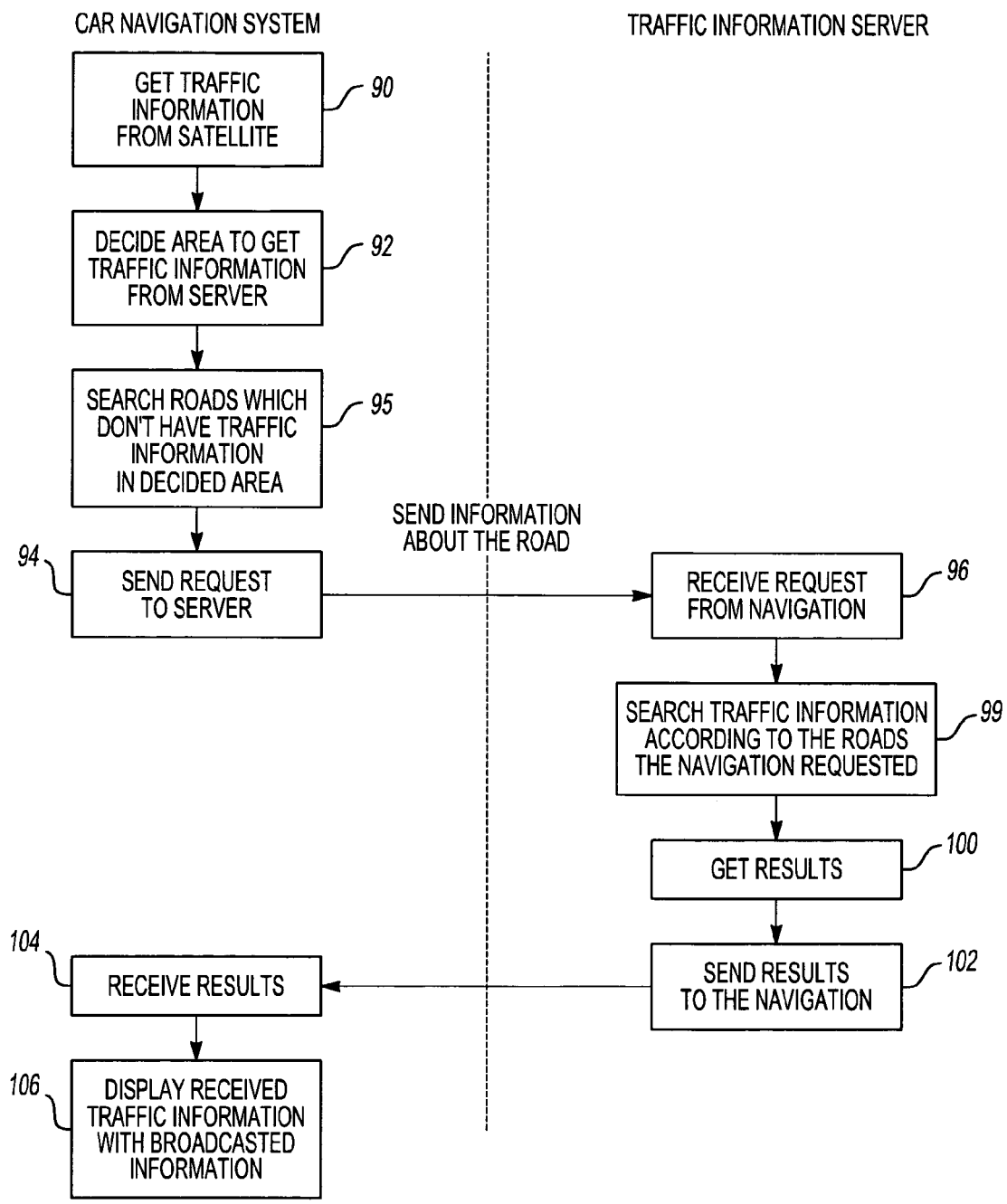
FIG. 15 is a process flowchart similar to FIG. 3, but illustrating a modification thereof.

A modification of the process flowchart illustrated in FIG. 3 is illustrated in FIG. 15. FIG. 15 differs from FIG. 3 in that the elimination of redundant data is performed by the navigation system 50 rather than the traffic server 70. As such, it includes an additional step 95 which limits the data request sent to the communication system 70 to only those road links for which the navigation system does not have stored information in the broadcast database. Consequently, by limiting the requested road link data from the communication system 70 to only those roads not included in the broadcast traffic information, it is no longer necessary to compare the local traffic information with the broadcast traffic information to eliminate redundant information. Consequently, step 98 of FIG. 3 is rendered unnecessary and, instead, replaced by step 99 which merely searches for the road links contained in the data request.

Since the data request in the embodiment of the invention shown in FIG. 15 is structured to automatically eliminate redundant information between the broadcast traffic data and the local traffic data, step 264 of FIG. 14 is also rendered unnecessary and, likewise, the traffic information filtering method 238 (FIG. 13) is rendered unnecessary.

In order to improve the traffic flow predictability and optimize the route selection characteristics of the navigation system, the present invention contemplates providing both real-time and predicted weather information as well as temporal non-traffic events, such as baseball games, parades and the like, in the statistical database 230 (FIG. 13). As best shown in FIG. 16, the structure of the database is shown and includes a location table number data field 310 as well as a service area data field 312 corresponding to the geographic area of the event. The statistical database further includes a data field corresponding to the location code 314 of the real-time, or predicted, event as well as a data field 316 corresponding to the traffic event code.

The traffic database illustrated in FIG. 16 further includes a data field 318 corresponding to the direction affected by the traffic event as well as a duration field 320 indicative of the duration of the traffic event as well as a data field 322 indicative of the diversion of the traffic event and a field 324 representative of the extent of sequential road links affected by the traffic event. The database structure also optionally includes a field 326 which may contain additional information for future use.

The database structure illustrated in FIG. 16 includes a field 328 which contains a weather code. As best shown in FIG. 17, different weather codes may be assigned not only as an indication of the type of weather, but also an indication of the severity of that weather. For example, presumably a heavy snow storm of more than four inches (code 45) would have a greater impact than a light snow storm of less than one inch (code 43).

Referring again to FIG. 16, the traffic database structure also includes a field 330 which may contain event codes relating to both real-time and predicted temporal non-traffic events. Such events could include, for example, the occurrence of sporting events, political events, and/or the like. In each case, these non-traffic temporal events all have a reasonably predictable impact on traffic flow and, for that reason, are stored in the statistical traffic database. FIG. 18 represents exemplary codes for various types of non-traffic temporal events.

Referring again to FIG. 16, each of the events stored in the statistical traffic database includes a timestamp 332 indicative of the time that the event either (1) occurred or (2) is predicted to occur in the future. Consequently, traffic flow conditions may be estimated not only based on historical or statistical data as well as the real-time data, but also in a predictive fashion in accordance with the predicted impact of various events on traffic flow.

Figures 19, 20:
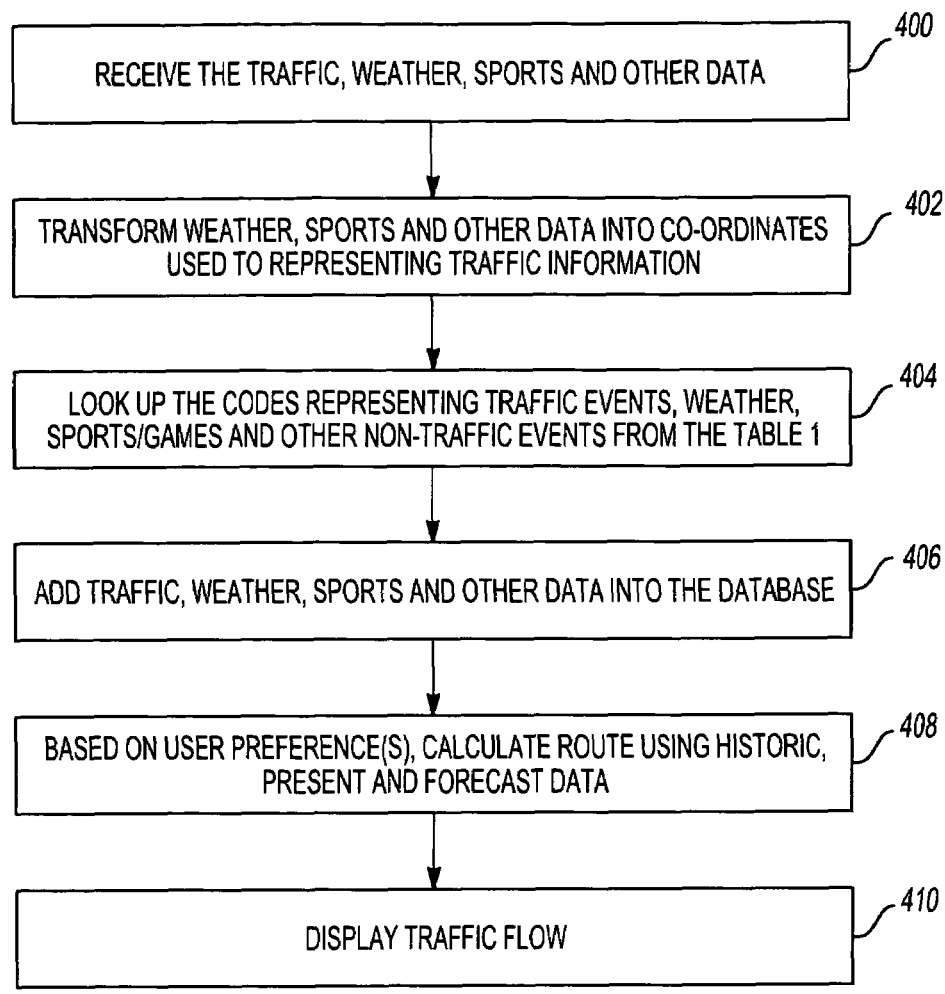
FIG. 19 is a flowchart illustrating a portion of the present invention.
FIG. 20 is a table of user preferences for use with the present invention.

With reference now to FIG. 19, an exemplary flowchart is illustrated showing the operation of the present invention, particularly when used to calculate the most favorable route from the current position of the vehicle and to the user inputted destination. At step 400, the navigation system first receives the traffic, weather, sports and other data from the communication system 70. Step 400 then proceeds to step 402.

At step 402, the navigation system transforms the weather and temporal non-traffic events into coordinates used to represent traffic information. Step 402 then proceeds to step 404. At step 404, the navigation system looks up the event codes representing not only traffic events, but also weather events and temporal non-traffic events from the various stored tables. Step 404 then proceeds to step 406 where the navigation system adds the traffic, weather and temporal non-traffic event data into the statistical database. Step 406 then proceeds to step 408 where, based upon user preferences discussed below, the navigation system using route calculation algorithms, calculates the most favorable route using the historic, real-time and forecast traffic-affecting data along the inputted route. This information is then displayed on the navigation system display 93 at step 410.

With respect to the user references, referenced at step 408, in most cases the most favorable route between the current position of the vehicle and the destination will be the route which takes the shortest time. However, in some cases, the user may want to limit the route selection based upon the user preferences.

For example, FIG. 20 illustrates exemplary user preferences which may be input as data to the system by the user and which will dictate the route selection calculated at step 408 (FIG. 19). For example, the user may elect to use the freeway systems only if the projected rainfall is less than two inches since freeway flooding is known to occur with higher rainfalls. In this case, the navigation system will include the freeway systems in all route optimizing calculations only if the weather information contained in the weather data field 320 of the statistical database structure (FIG. 16) predicts less than two inches of rain. Otherwise, all freeways will be excluded by the navigation system during the calculation of the most favorable route.

Figure 21:
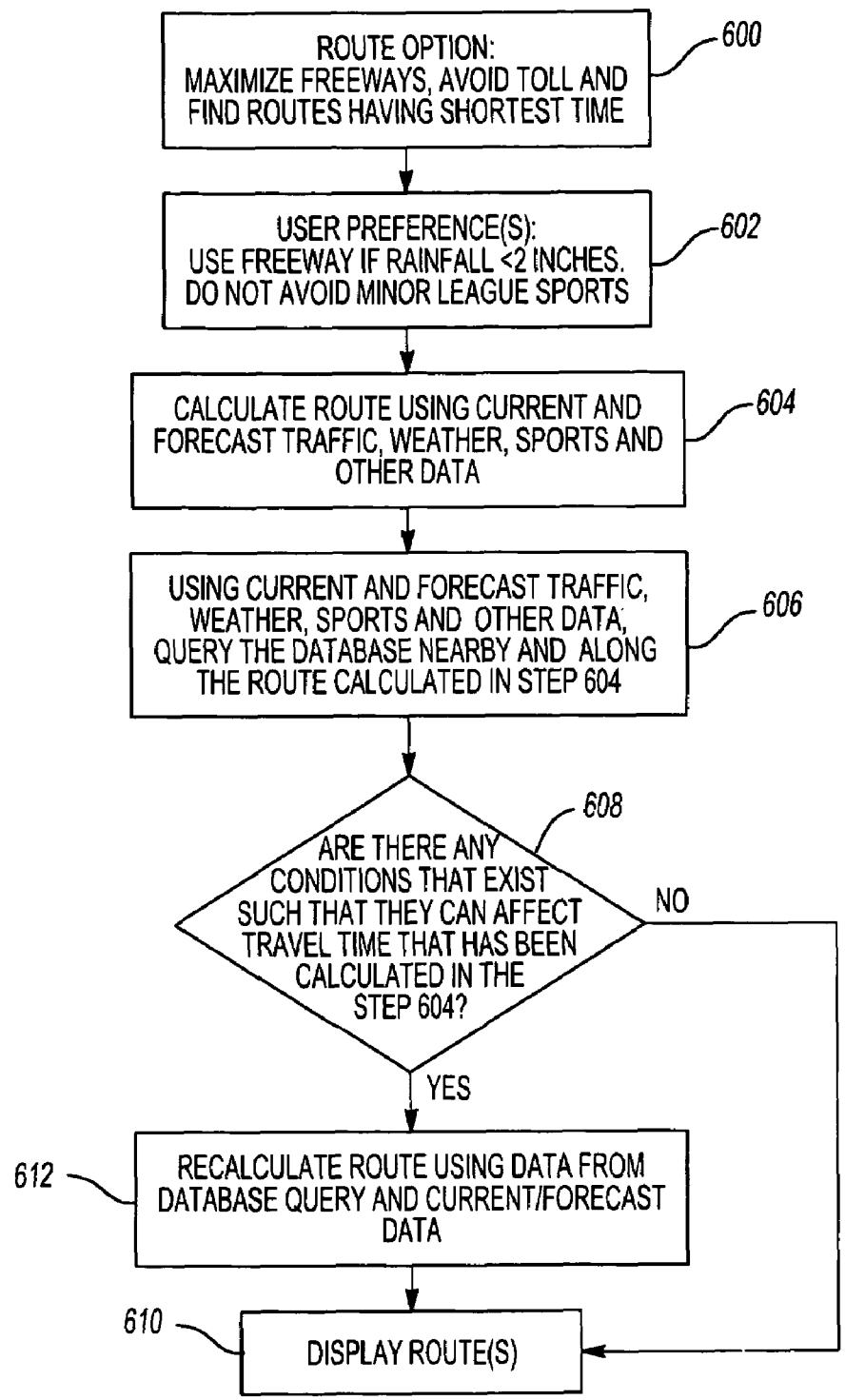
FIG. 21 is a flowchart illustrating the route calculation procedure.

With reference now to FIG. 21, a flowchart illustrating the calculation of the most favorable route is shown. At step 600, the system first sets predetermined route options. These route options may include, for example, the maximum use of freeways, the avoidance of road tolls, and routes having the shortest travel time. Step 600 then proceeds to step 602.

At step 602, the default options are replaced by user preferences, if any, entered by the user. For example, these user preferences could include the avoidance of freeways when rainfall exceeds two inches, the avoidance of sporting events, and the like. Step 602 then proceeds to step 604.

At step 604, the most favorable route is then calculated using both the current and forecast traffic, weather, and non-traffic temporal event data received by the navigation system 50. Step 604 then proceeds to step 606.

At step 606, the database is queried for alternate routes nearby the route calculated at step 604. Step 606 then proceeds to step 608 which determines if there are any conditions that exist that will affect the travel time calculated at step 604. If not, step 608 proceeds to step 610 and displays the most favorable route. Otherwise, step 608 proceeds to step 612 which calculates a new route using both current and forecast data.

Figure 22:
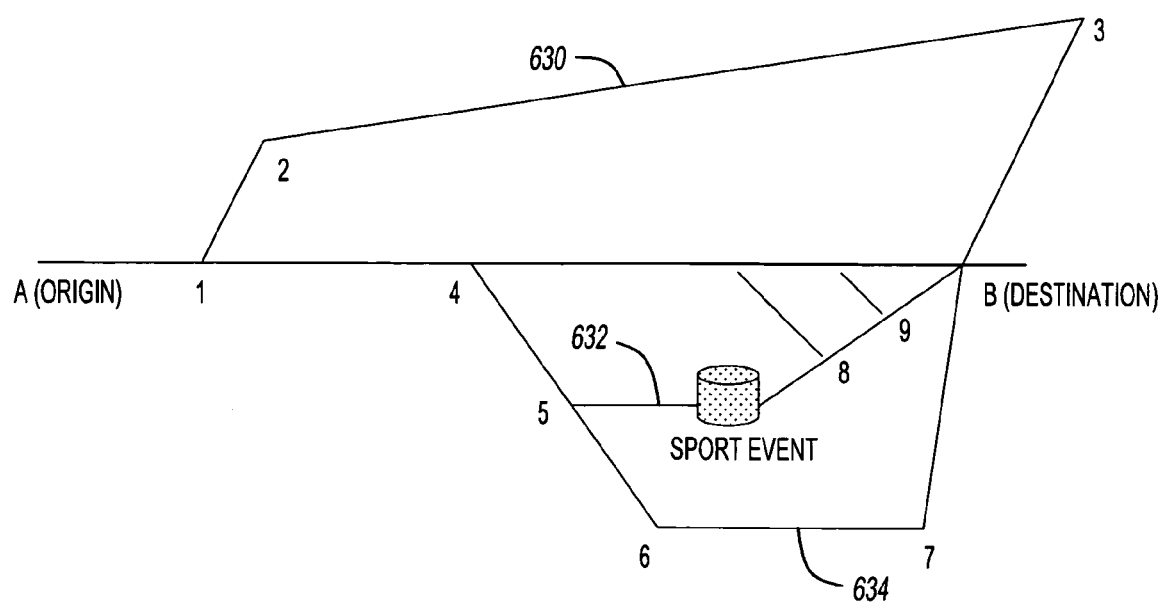
FIG. 22 is an exemplary pictorial representation of FIG. 21.

FIG. 22 illustrates an exemplary route calculation between a point of origin A and a destination B. For the purpose of this example, the links A-1, 1-4 and 4-B all constitute a freeway whereas the remaining road links illustrated in FIG. 22 constitute secondary roads. Furthermore, a predicted rainfall on link 4-B is greater than two inches and the user has inputted a preference to avoid freeways whenever the rainfall exceeds two inches. Mild congestion exists on link 7-B while a sport event occurs along link 5-8.

Using the normal system default set at step 600, the most favorable route would be the direct freeway between point A and point B, i.e. links A-1, 1-4 and 4-B. However, in this example, the user has elected not to use freeways in the event of rainfall in excess of two inches. Consequently, since user preferences take precedent over the default calculated routes, the direct freeway route between A and B will not be displayed as the favored route.

Consequently, at step 606, the database is queried for additional near routes between points A and B. A plurality of routes are found during that query. These include a first route 630 having road links A-1, 1-2, 2-3 and 3-B. Based upon the information provided to the navigation system by the traffic content providers, the traffic flow along route 630 is free flowing, but significantly longer in distance than the direct route between points A and B.

The query to the database also produces a second route 632 having route links A-1, 1-4, 4-5, 5-8, 8-9 and 9-B. However, a sport event occurring on road link 5-8 is projected to lead to significant traffic congestion.

The database inquiry also produces a third route 634 having road links A-1, 1-4, 4-5, 5-6, 6-7 and 7-B. Light traffic congestion is projected along road link 7-B. However, despite this light traffic congestion, the travel time for route 634 is less than the other two routes 630 and 632. Consequently, route 634 is displayed on the screen for the navigation system as the most favorable route.

From the foregoing, it can be seen that the present invention provides a vehicle navigation system which utilizes historical, real-time and predicted traffic flow information to calculate the most favorable route which may be used by the vehicle operator. Furthermore, these calculations include not only weather information, but also non-traffic temporal events which nevertheless have an impact on traffic flow.

Additionally, the present invention utilizes both a broadcast system to obtain data regarding traffic flow and traffic events on major or primary road segments and simultaneously obtains traffic flow information and other traffic-affecting information from a local communication system regarding local roads in a local geographic area. By combining this information together, the navigation system of the present invention may not only display, but also provide route calculation for both major and local roads.

Having described our invention, however, many modifications thereto will become apparent to those skilled in the art to which it pertains without deviation from the spirit of the invention as defined by the scope of the appended claims.

We claim:

1. A vehicle navigation apparatus for use with a traffic information broadcast system which transmits traffic data relating to primary road segments and a communication system which transmits traffic data relating to road segments in a local geographic area comprising:
    a broadcast receiver which receives broadcast traffic data from the broadcast system and stores data representative of the broadcast traffic data in a broadcast traffic database,
    a communication receiver which receives local traffic data from the communication system and stores data representative of the local traffic data in a local traffic database,
    means for eliminating redundant data in said broadcast traffic database and said local traffic database,
    a display screen,
    a processor which displays traffic information on said screen corresponding to the received broadcast traffic data and the received local traffic data.

2. The invention as defined in claim 1 wherein said eliminating means comprises means for identifying identical road segments in said broadcast traffic database and said local traffic database, and means for deleting one of said identical road segments in said broadcast traffic database and said local traffic database.

3. A vehicle navigation apparatus for use with a traffic information broadcast system which transmits traffic data relating to primary road segments and a communication system which transmits traffic data and traffic-affecting data relating to road segments in a local geographic area comprising:
    a broadcast receiver which receives broadcast traffic data from the broadcast system and stores data representative of at least a portion of the broadcast traffic data in a broadcast traffic database,
    a communication receiver which receives local traffic data and traffic-affecting data from the communication system and stores data representative of at least a portion of the local traffic data and traffic-affecting data in a local traffic database,
    a display screen,
    a processor which calculates a favorable route from the current position of the navigation system to a destination position as a function of the received broadcast traffic data, the received local traffic data, and traffic-affecting data, said processor displaying said favorable route on said display screen.

4. The invention as defined in claim 3 wherein said traffic-affecting data comprises weather data.

5. The invention as defined in claim 4 wherein said weather data comprises weather forecast data.

6. The invention as defined in claim 5 wherein said weather forecast data comprises data representative of the type, severity and time of the forecasted weather.

7. The invention as defined in claim 3 wherein said traffic-affecting data comprises data representative of temporal non-traffic, non-weather events.

8. The invention as defined in claim 3 wherein said traffic-affecting data comprises a temporal non-traffic event and the severity of said temporal non-traffic event.

9. The invention as defined in claim 3 and comprising a database of historical traffic flow conditions on at least a plurality of road segments, and wherein said processor calculates said favorable route as a further function of said historical traffic flow conditions stored in said database.

10. The invention as defined in claim 3 wherein said processor calculates said favorable route as a further function of user driving preferences.

11. A method of displaying traffic information on vehicle navigation system comprising the steps of:
    receiving broadcast traffic data for a first plurality of road segments,
    storing at least a portion of said first plurality of road segments in a broadcast traffic database,
    receiving local traffic and traffic-affecting information for a second plurality of road segments,
    storing at least a portion of said second plurality of road segments in a local traffic database,
    designating a destination location,
    calculating a favorable route to the destination location as a function of information stored in said broadcast traffic database and said local traffic database.

12. The invention as defined in claim 11 and further comprising the step of creating a historical database of traffic flow conditions for a plurality of selected road segments, and wherein said calculating step further comprises the step of calculating the favorable route as a further function of said historical database.

13. The invention as defined in claim 11 and further comprising the step of eliminating redundant data between said broadcast database and said local traffic database.

14. A vehicle navigation method for use with a traffic information broadcast system which transmits traffic data relating to primary road segments and a communication system which transmits traffic data relating to road segments in a local geographic area comprising the steps of:
    receiving broadcast traffic data from the broadcast system and storing data representative of the broadcast traffic data in a broadcast traffic database,
    receiving local traffic data from the communication system and storing data representative of the local traffic data in a local traffic database,
    eliminating redundant data in said broadcast traffic database and said local traffic database, and
    displaying traffic information on a display screen corresponding to the received broadcast traffic data and the received local traffic data.

15. The invention as defined in claim 14 wherein at least one of said broadcast traffic data and local traffic data includes data corresponding to non-traffic temporal events.

* * * * *